United States Patent
Wong et al.

(10) Patent No.: US 8,149,881 B2
(45) Date of Patent: Apr. 3, 2012

(54) CENTRALIZED NODE CLOCK AUTO RECONFIGURATION

(75) Inventors: Kin-Yee Wong, Ottawa (CA); Peter Roberts, Stittsville (CA)

(73) Assignee: Alcatel Lucent, Paris (FR)

(*) Notice: Subject to any disclaimer, the term of this patent is extended or adjusted under 35 U.S.C. 154(b) by 112 days.

(21) Appl. No.: 12/492,882

(22) Filed: Jun. 26, 2009

(65) Prior Publication Data
US 2010/0329284 A1    Dec. 30, 2010

(51) Int. Cl.
*H04J 3/06* (2006.01)
(52) U.S. Cl. .............. 370/503; 370/395.2; 375/359; 375/355; 375/356; 375/357
(58) Field of Classification Search .......... None
See application file for complete search history.

(56) References Cited

U.S. PATENT DOCUMENTS

| | | | |
|---|---|---|---|
| 6,317,475 B1 * | 11/2001 | Kasurinen | 375/356 |
| 6,567,422 B1 * | 5/2003 | Takeguchi et al. | 370/503 |
| 6,707,828 B1 * | 3/2004 | Wolf | 370/503 |

OTHER PUBLICATIONS

Technical Committee on Sensor Technology(TC-9), IEEE Standard for a Precision Clock Synchronization Protocol for Network Measurement and Control Systems, IEEE Std 1588-2008, Jul. 2008, NYNY.

* cited by examiner

*Primary Examiner* — Kibrom T Hailu
(74) *Attorney, Agent, or Firm* — Kramer & Amado, P.C.

(57) ABSTRACT

The invention is directed to a method and system for providing centralized automated synchronization clock reconfiguration in packet switched telecommunications networks having network nodes that do not implement Synchronization Status Messaging (SSM) internally. This is especially useful when integrating TDM networks with packet switching network elements having T1 and E1 interfaces.

11 Claims, 3 Drawing Sheets

CENTRALIZED NODE CLOCK AUTO RECONFIGURATION

FIELD OF THE INVENTION

The invention is directed to packet switching communication networks, particularly to clock auto reconfiguration for timing over packet networks.

BACKGROUND OF THE INVENTION

As telecommunications networks are increasingly moving from time division multiplexing (TDM) based protocols such as synchronous optical networking (SONET) to packet switching technologies, maintaining network wide synchronization of nodes has become more challenging. This is especially important when integrating TDM networks with packet switching network elements having T1 and E1 interfaces. Synchronization protocols such as Synchronization Status Messaging (SSM) allow for maintaining the network synchronization using a hierarchical network clocking structure of a master or primary clock such as a Stratum 1 reference and slave or secondary clocks such as Stratum 2 or Stratum 3. SSM provides for selection of the best reference to be used at each network element. SSM provides a minimal level of timing loop avoidance to ensure two adjacent network elements do not time off each other, but it does not ensure avoidance of loops involving three or more network elements. Routers and other packet switching network elements are increasingly used to provide network synchronization using timing-over-packet or synchronous Ethernet techniques. Currently SSM is not yet universal for packet switching network elements; not all telecommunication packet switching network elements support SSM. Routers may not have sufficient network intelligence to initiate automatic clock reconfiguration based on network failures.

Therefore, a means of providing a centralized automatic clock reconfiguration that does not require SSM-based selection capabilities within the routers is desired.

SUMMARY OF THE INVENTION

One aspect of the invention provides a method of providing clock auto-reconfiguration in a communications network having a plurality of network nodes. The method has steps of: receiving at a network management entity, a status message indicating loss of clock reference by first node of the plurality of network nodes; polling a plurality of second nodes of the plurality of network nodes for clock status; assigning a clock hierarchy for the plurality of network nodes; transmitting a message to each of the plurality of network nodes, defining a new clock configuration.

In some embodiments, the step of polling a plurality of second nodes comprises polling each node for clock quality and clock traceability for each of one or more clock sources.

In some embodiments, the step of assigning a clock hierarchy comprises, for each node, determining a best clock source.

In some embodiments, the step of determining best clock source comprises ensuring network clock topology is loop free.

In some embodiments, the step of receiving a synchronization status message uses a synchronization management message.

In some embodiments, the communications network is a packet switching network.

Another aspect of the present invention provides a program storage device readable by a machine, tangibly embodying a program of instructions executable by the machine to perform method steps described above.

A further aspect of the present invention provides a system for providing clock auto-reconfiguration in a communications network. The system comprises: a plurality of network nodes, each the node configured to receive network clock information from adjacent nodes; a network management entity configured to receive clock information from the plurality of network nodes, wherein the network management entity is further configured to: assign a clock hierarchy for each of the plurality of network nodes, receive a status message indicating loss of clock reference by a first node of the plurality of network nodes; poll a plurality of second nodes of the plurality of network nodes for clock status; assign a clock hierarchy for each wherein the network management entity is further configured to: assign a clock hierarchy for each of the plurality of network nodes; and transmit a message to each of the plurality of network nodes.

In some embodiments, the network management entity is further configured to poll the plurality of second nodes for clock quality and clock traceability for each of one or more clock sources.

In some embodiments, the network management entity is further configured to assign a clock hierarchy by determining a best clock source for each node.

In some embodiments, the network management entity is further configured to ensure network clock topology is loop free.

BRIEF DESCRIPTION OF THE DRAWINGS

Some embodiments of apparatus and/or methods in accordance with embodiments of the present invention are now described, by way of example only, and with reference to the accompanying drawings in which.

In the figures like features are denoted by like reference characters.

DETAILED DESCRIPTION

Figure 1:
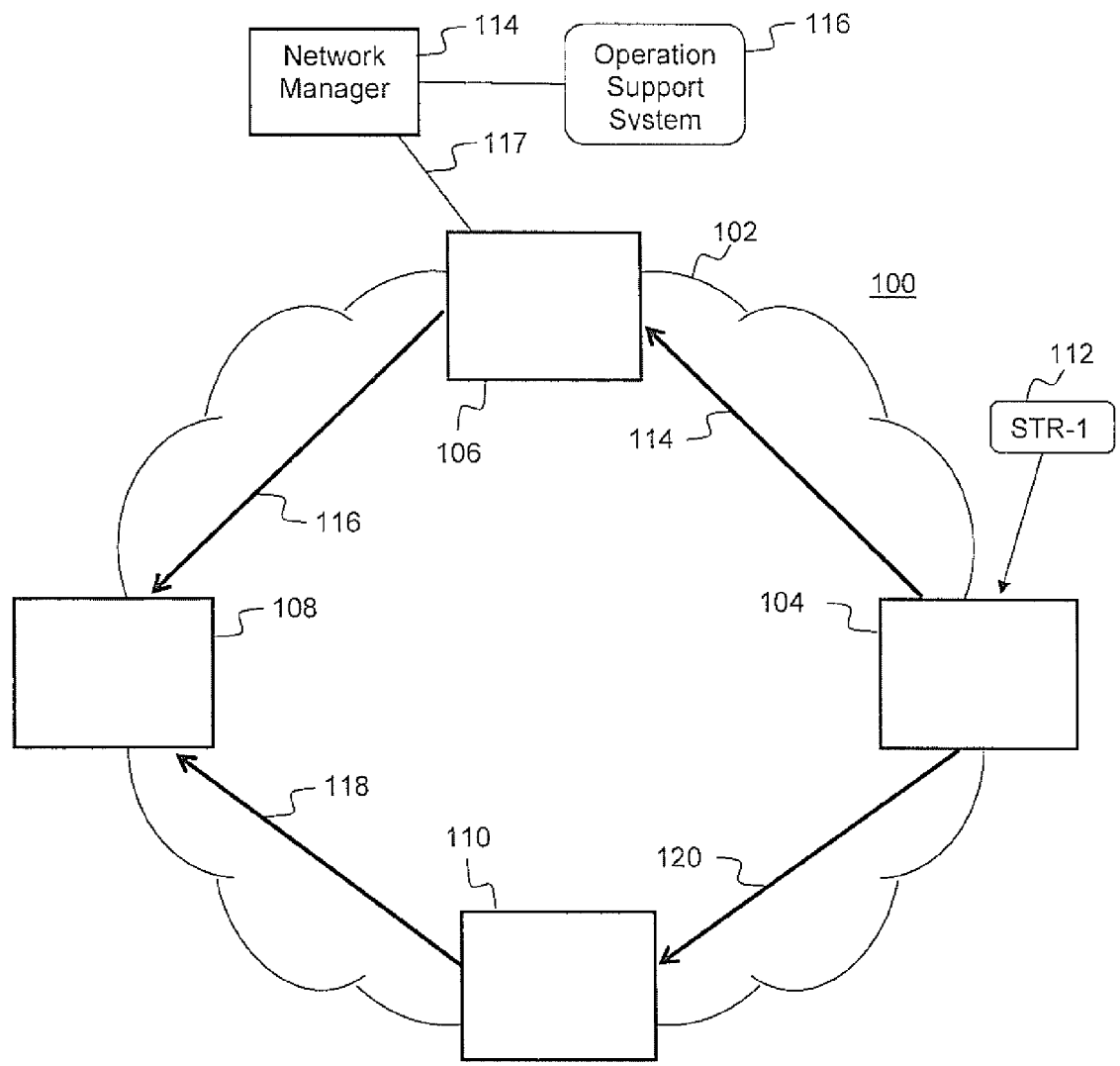
FIG. 1 illustrates a network configuration using timing-over-packet synchronization.

Referring to FIG. 1, network configuration 100 has network nodes 104, 106, 108, 110 interconnected via telecommunications network 102. The network nodes (network elements, nodes) can be switches, routers, multiplexers or other telecommunications devices. Network Manager 114 provides Operations, Administration, Maintenance (OAM) support and control of the network nodes using Operation Support System (OSS) application software 116 and communicates to nodes in network 102 via communications link 117 to node 106. The OSS application software 116 on network manager 114 retrieves configuration and status information from network nodes 104, 106, 108, 110 via Command Line Interface (CLI) or Simple Network Management Protocol (SNMP) or Transaction Language 1 (TL1) messaging. OSS application software 116 can issue SSM-like synchronization commands to the nodes.

The network nodes use timing-over-packet synchronization in a master-slave hierarchy. Node 104 derives its synchronization clock signal from a primary reference source 112 that is Stratum 1 traceable. Nodes 106 and 110 derive their synchronization clock signal via IEEE1588v2 (otherwise known as IEEE Std 1588™-2008) timing packets via links 114 and 120 respectively. Node 108 receives synchronization timing packets from both nodes 106 and 110 via links 116 and 118 respectively, and uses one of nodes 106 and 110 as its timing source as selected by a predefined hierarchy.

Figure 2:
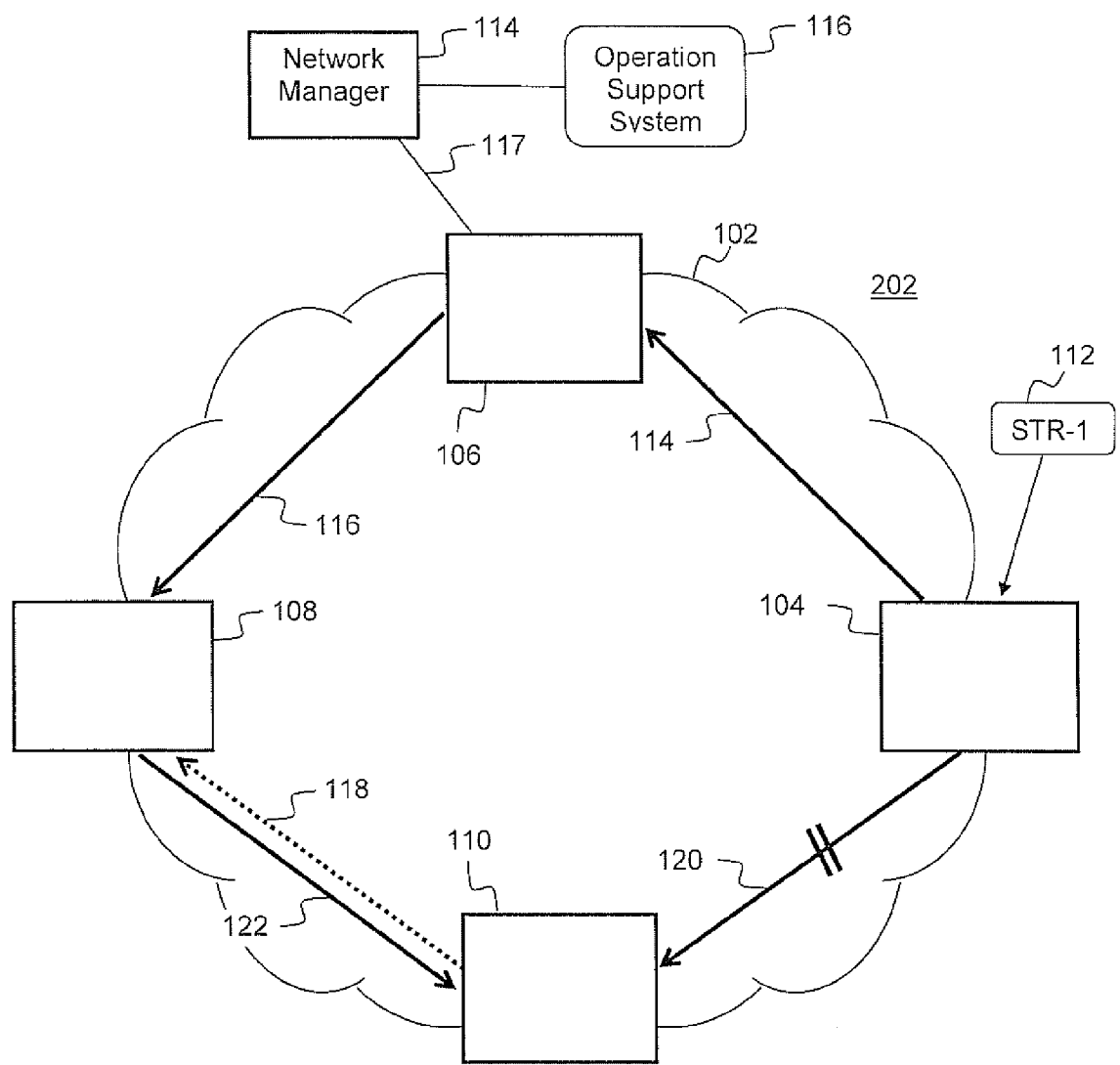
FIG. 2 illustrates the network of FIG. 1 with a network failure.

In the event of a communication failure such as a node failure, or a link failure as illustrated in FIG. 2, failure of link 120, causes node 110 no longer receive synchronization information from node 104. Node 110 then reverts to free-running or holdover mode and sends a synchronization management message to the OSS application software 116 advising of the change in synchronization status. The OSS application software 116 then analyzes the network topology to determine a new synchronization topology and communicates the new topology to the nodes 104, 106, 108, 110. Thus the OSS application software 116 instructs node 108 to send timing packets via link 122 to node 110 and instructs node 110 to accept synchronization timing from node 108. The OSS application software 116 of Network Manager 114 typically provides network rerouting capabilities already and with the described embodiment of this invention, thus also provides synchronization rerouting capabilities by providing synchronization intelligence to network nodes which are not provisioned with SSM. This facilitates retrofitting existing networks with SSM-like synchronization. This can have cost benefits of not requiring SSM capabilities built into every network node. Because synchronization topology is managed centrally by the network manager 114 which has a global view of the network, problems like timing loops in the network can be avoided. These timing loops might otherwise occur in complex networks having synchronization timing managed locally by individual SSM-equipped network nodes, wherein each node reacts separately without network intelligence. Embodiments of the present invention can provide SSM-like clock auto reconfiguration within a network without SSM nodes.

Another potential advantage is that synchronization planning can be managed dynamically by the OSS application software 116 on the Network Manager 114.

The embodiment described is for the packet switching network of FIG. 1. Note that embodiments of this invention are also applicable to other types of communications networks, such as, for example, Synchronous Optical NETworks (SONET)/Synchronous Digital Hierarchy (SDH)/Plesiochronous Digital Hierarchy (PDH) networks. In these other types of networks, network elements do not always have full SSM functionality. Embodiments of the present invention could provide the necessary SSM-like functionality to these nodes but managed from a centralized network management entity.

Figure 3:
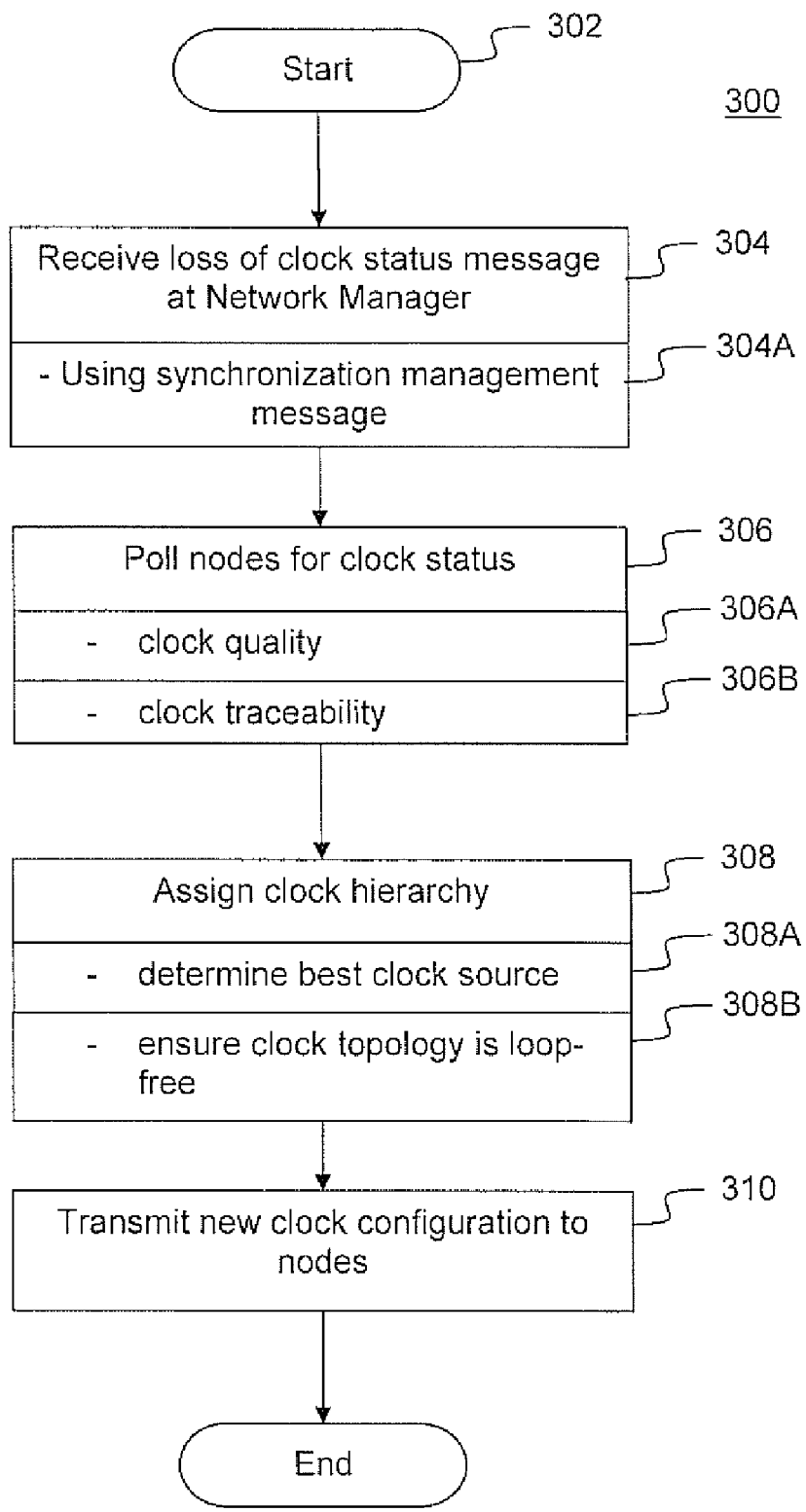
FIG. 3 illustrates a method for centralized node clock auto reconfiguration.

Referring to FIG. 3, in one embodiment of the method of the present invention, at step 304, the network manager 114 receives a status message from node 110 of loss of clock signal from node 104. As indicated at substep 304A, the status message can be sent using a synchronization management message.

At step 306, the OSS application software 116 of Network Manager 114 polls all the other nodes in the network for their current clock status. In some embodiments, the poll can also be sent to node 110. As indicated at substeps 306A and 306B, the poll can include clock quality and clock traceability at each node.

At step 308, OSS application software 116 of Network Manager 114 builds a network synchronization topology and assigns a clock hierarchy for each node in the network. As indicated at substeps 308A and 308B, the clock hierarchy can be determined to ensure the best clock source for each node based on the current topology and to ensure that the clock synchronization topology is loop-free.

At step 310, OSS application software 116 of Network Manager 114 transmits the new clock configuration to each of the nodes so that each node is instructed where to receive synchronization information form and where to transmit clock synchronization timing packets, thereby initiating automatic clock reconfiguration as a result of failure in links or nodes of the network.

A person of skill in the art would readily recognize that steps of various above-described methods can be performed by programmed computers. Herein, some embodiments are also intended to cover program storage devices, e.g., digital data storage media, which are machine or computer-readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Numerous modifications, variations and adaptations may be made to the embodiment of the invention described above without departing from the scope of the invention, which is defined in the claims.

What is claimed is:

1. A method of providing clock auto-reconfiguration in a communications network comprising a plurality of network nodes, wherein the plurality of network nodes are not provisioned with Synchronization Status Messages (SSMs), the method comprising:
   receiving at a network management entity, a status message indicating a loss of a clock reference by a first node of said plurality of network nodes;
   polling all other network nodes for current clock status;
   assigning a clock hierarchy for said plurality of network nodes;
   transmitting a message to each of said plurality of network nodes, defining a new clock configuration.

2. The method of claim 1, wherein the step of polling the other network nodes further comprises:
   polling each node of the other network nodes for clock quality and clock traceability for each of one or more clock sources.

3. The method of claim 1, wherein the step of assigning the clock hierarchy comprises, for each node:
   determining a best clock source.

4. The method of claim 3, wherein the step of determining the best clock source further comprises:
   ensuring a network clock topology is loop free.

5. The method of claim 1, wherein said communications network is a packet switching network.

6. A system for providing clock auto-reconfiguration in a packet switching network, the system comprising:
   a plurality of network nodes, each said node configured to receive network clock information from adjacent nodes, wherein the plurality of network nodes are not provisioned with Synchronization Status Messages (SSMs);
   a network management entity configured to receive clock information from said plurality of network nodes, assign a clock hierarchy for each of said plurality of network nodes, receive a status message indicating a loss of a clock reference by a first node of said plurality of network nodes, poll all other network nodes of said plurality of network nodes for a clock status, assign a clock hierarchy for each of said plurality of network nodes, and transmit a message to each of said plurality of network nodes to define a new clock configuration.

7. The system of claim 6, wherein said network management entity is further configured to poll each node of the other network nodes for clock quality and clock traceability for each of one or more clock sources.

8. The system of claim 6, wherein said network management entity is further configured to assign the clock hierarchy by determining a best clock source for each node.

9. The system of claim 8, wherein said network management entity is further configured to ensure a network clock topology is loop free 10. The system of claim 6, wherein said communications network is a packet switching network.

11. A program storage device readable by a machine, tangibly embodying a program of instructions executable by the machine to perform the method steps of claim 1.

* * * * *